United States Patent
Parks et al.

(10) Patent No.: US 7,006,635 B2
(45) Date of Patent: Feb. 28, 2006

(54) METHOD AND APPARATUS FOR CLOCK SYNCHRONIZATION USING QUANTUM MECHANICAL NON-LOCALITY EFFECTS

(75) Inventors: Allen D. Parks, Fredericksburg, VA (US); Gregory A. Balchin, Alexandria, VA (US); Scott E. Spence, Fredericksburg, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 902 days.

(21) Appl. No.: 09/943,433

(22) Filed: Aug. 30, 2001

(65) Prior Publication Data

US 2002/0041687 A1    Apr. 11, 2002

Related U.S. Application Data

(60) Provisional application No. 60/229,063, filed on Aug. 31, 2000.

(51) Int. Cl.
*H04L 9/00*      (2006.01)
*H04L 5/00*      (2006.01)
*H04L 7/00*      (2006.01)
*G06F 1/12*      (2006.01)
*G06F 13/42*     (2006.01)

(52) U.S. Cl. .............. 380/263; 713/400; 713/401
(58) Field of Classification Search ............... 380/263; 713/400, 401
See application file for complete search history.

(56) References Cited

U.S. PATENT DOCUMENTS

| | | | |
|---|---|---|---|
| 5,163,071 A | * | 11/1992 | Gelin ..................... 375/354 |
| 5,307,410 A | * | 4/1994 | Bennett ................... 380/256 |
| 5,339,182 A | | 8/1994 | Kimble et al. ............. 359/112 |
| 5,732,139 A | | 3/1998 | Lo et al. ................... 380/28 |
| 5,764,765 A | | 6/1998 | Phoenix et al. ............ 380/21 |
| 5,768,378 A | | 6/1998 | Townsend et al. ........... 380/21 |
| 5,850,441 A | | 12/1998 | Townsend et al. .......... 380/21 |
| 5,990,721 A | | 11/1999 | Mellitz .................... 327/292 |
| 6,057,541 A | | 5/2000 | Steenblik ................. 250/225 |

(Continued)

OTHER PUBLICATIONS

Marmet, P, "Quantum Mechanics and its Paradox: A Realistic Solution to Mermin's EPR Apparatus", Physics Essays, vol. 6, No: 3 1993 pp. 436-439.

(Continued)

*Primary Examiner*—Gilberto Barron, Jr.
*Assistant Examiner*—Benjamin E. Lanier
(74) *Attorney, Agent, or Firm*—Gerhard W. Thielman, Esq.; Scott R. Boalick, Esq.; James B. Bechtel, Esq.

(57) ABSTRACT

A method for synchronizing a master clock to a slave clock located in master and slave devices communicating with one another via a laser signal beam and a communications channel, each of the devices including a homodyne detector for determining a respective correlation pattern with respect to a phase tuned local oscillator includes steps for recording master and slave correlation patterns while the signal beam cycles between first and second operating modes, transmitting the master correlation pattern and associated first and second times at which the signal beam shifted between the first and second operating modes and between the second and first operating modes over the communications channel, comparing a portion of the master correlation pattern between the first and second times to the slave correlation pattern to thereby determine the time offset between the master and slave correlation patterns, and applying the time offset to the slave clock. A corresponding clock synchronization system is also described.

22 Claims, 3 Drawing Sheets

U.S. PATENT DOCUMENTS 6,133,876 A * 10/2000 Fullerton et al. ............ 342/375
6,247,138 B1 * 6/2001 Tamura et al. .............. 713/600

OTHER PUBLICATIONS

Cramer, John G., "Generalized Absorber Theory and the Einstein-Podolsky-Rosen Paradox", Physical Review D, vol. 22, No. 2, pp. 362-376.

Cramer, John G., "Quantum Nonlocality and the Possibility of Superluminal Effects", Proceedings of the NASA Breakthrough Propulsion Physics Workshop, Cleveland, OH, Aug. 12-14, 1997.

Cramer, J.G., "The Arrow of Electromagnetic Time and Generalized Absorber Theory", Foundations of Physics 13, 887 (1983).

Cramer, John G., "The Transactional Interpretation of Quantum Mechanics", Reviews of Modern Physics 58, pp. 647-688, Jul., 1986.

* cited by examiner

METHOD AND APPARATUS FOR CLOCK SYNCHRONIZATION USING QUANTUM MECHANICAL NON-LOCALITY EFFECTS

BACKGROUND OF THE INVENTION

The present invention relates generally to methods for clock synchronization. More specifically, the present invention relates to methods for clock synchronization using quantum mechanical non-locality effects. A corresponding apparatus is also disclosed.

The present invention is based on Provisional Patent Application No. 60/229,063, which was filed on Aug. 31, 2000, and which is incorporated by reference in its entirety.

STATEMENT OF GOVERNMENT INTEREST

The invention described herein was made in the performance of official duties by employees of the Department of the Navy and, thus, may be manufactured, used, licensed by or for the Government of the United States of America for governmental purposes without the payment of any royalty thereon or therefor.

The ability to accurately synchronize clocks is of great general interest. For example, many current clock-dependent applications attempt to synchronize their clocks with the master clock time broadcast by the Global Positioning Satellite (GPS) system. In order to achieve the greatest possible synchronization accuracy, corrections must be made to compensate for the finite time of travel of the broadcast signal through the earth's atmosphere and ionosphere, as well as for the small processing times associated with sending and receiving the signal. The error that is introduced by the uncertainties associated with the propagation of the signal through the atmosphere and ionosphere is typically half of the total error.

U.S. Pat. No. 5,990,721 to Mellitz discloses a high-speed synchronous clock supplied to multiple digital devices which represents one method for overcoming time delay errors. More specifically, the clock signals produced by the '721 patent are absolutely synchronous (no delay between corresponding clock signals exceeds 500 pico-seconds). Thus, the apparatus provides the ability to synchronize two or more clocks at distinct locations in such a manner that the usual time synchronization error induced by the speed of light separation distance is eliminated. However, the apparatus accomplishes this feat by establishing a standing wave in a communications channel; the standing wave is employed as the timing signal. Thus, while this technique may be employed in a hardwired system, the technique is not adaptable to distributed systems.

While the accuracy levels achieved by the above-mentioned techniques are quite impressive, any other techniques that might be employed to improve upon them could be valuable for such military applications as cooperative engagement operations. There it is imperative that the information describing the events in a rapidly changing battlespace that is collected by and shared with a number of assets distributed over a large temporal-geographic domain be tagged with an extremely accurate time that is common to all participants in the engagement.

What is needed is a system and corresponding method for clock synchronization that provides the ability to synchronize two (or more) clocks at different locations in such a manner that the usual time synchronization error associated with electromagnetic transmission of signals between clocks is avoided. It would be particularly desirable if the method were secure from eavesdropping.

It should be mentioned at this juncture that all of the patents and articles mentioned herein are incorporated herein by reference in their entireties.

SUMMARY OF THE INVENTION

Based on the above and foregoing, it can be appreciated that there presently exists a need in the art for a clock synchronization method and corresponding apparatus therefor which overcomes the above-described deficiencies. The present invention was motivated by a desire to overcome the drawbacks and shortcomings of the presently available technology, and thereby fulfill this need in the art.

According to current state-of-the-art aspect, hereafter known as the continuous supply aspect, the present invention provides a method for synchronizing a slave clock to a master clock located in slave and master devices, respectively, communicating from the master system to the slave system via a laser signal beam and a communications channel, each of the master and slave devices including a homodyne detector system for measuring patterns with respect to a phase tuned local oscillator. These patterns will range in a continuous manner from exhibiting Einstein-Podolsky-Rosen (EPR) correlation patterns to non-correlation patterns. The process of going from non-correlation to correlation, and back to non-correlation is hereafter known as the V step method. Advantageously, the continuous supply aspect method includes steps for recording master and slave patterns while the signal (and idler) beam(s) cycle in a V step operating mode, transmitting the slave correlation/non-correlated pattern to the slave system contained by the signal beam and keeping the master correlation/non-correlated pattern contained by the idler beam, comparing a portion of the slave V step correlation pattern to the master V step correlation pattern to thereby determine the time offset between the master and slave correlation patterns, and applying the time offset to the slave clock.

If desired, the variance between the master and slave correlation patterns can be determined in accordance with the expression:

$$V = \langle [\hat{I}/\lambda) - (g/\mu)\hat{J}]^2 \rangle$$

where

V is the variance $\mu$ is the phase offset associated with a master homodyne detector generating the master correlation pattern corresponding to $\hat{J}$.

$\hat{J}$ is the idler homodyne current signal received by the master device, $\lambda$ is the phase offset associated with a slave homodyne detector generating the slave correlation pattern corresponding to $\hat{I}$, $\hat{I}$ is the signal homodyne current signal received by the slave device, and g is a scaling factor.

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which.

DETAILED DESCRIPTION OF THE PREFERRED EMBODIMENTS

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The macroscopic world is adequately described by classical physics, which ties the world together through strictly local connections. Specifically, object A affects object B locally when it either touches object B or touches something else that touches B. Thus, classical local connections—or interactions—are impossible unless there is something there to mediate them. In addition, such interactions tend to diminish in strength with separation distance, e.g., gravitational interactions, and are restricted by special relativity to traveling no faster than light speed.

These connections form the basis for our intuitive perception of the universe. However, the true underlying micro-nature of the universe is more accurately described by the most successful of all scientific theories—quantum mechanics. Even though many of the physical properties of the micro-world predicted by the quantum theory are extremely counter-intuitive, they have been verified experimentally. Perhaps the most counter-intuitive property of quantum reality is its non-local nature. In contrast with classical locality theories, quantum non-locality suggests that the properties of quantum systems can be correlated such that they can influence one another:

(1) instantaneously, (2) in a manner that does not diminish with distance, and (3) without being mediated by fields or shielding.

Such correlations are generally referred to as Einstein-Podolsky-Rosen (EPR) correlations in honor of the originators of the famous "gedanken" experiment posed by them in 1935 to refute the notions of quantum reality, as described in the paper by A. Einstein, B. Podolsky, and N. Rosen in Phys. Rev. 47, 777 (1935). Albert Einstein disliked quantum mechanics, as developed by Heisenberg, Schrödinger, Dirac, and others, because it had many strange features that ran head-on into Einstein's understanding of how a proper universe ought to operate. Over the years, he developed a list of objections to the various peculiarities of quantum mechanics. At the top of Einstein's list of complaints was what he called "spooky actions at a distance." Einstein's "spookiness" is now called nonlocality, the mysterious ability of Nature to enforce correlations between separated but entangled parts of a quantum system.

It will be appreciated that the quantum-mechanical EPR paradox is essentially a demonstration that the results of quantum mechanics are logically inconsistent with the premise that a measurement made with one instrument cannot influence the measurement made by another instrument if the measurement events are separated by a spacelike interval. This is sometimes called the locality premise. EPR correlations have recently been shown to exist over distances exceeding 10 km, as documented in the article by W. Tittel, J. Brendel, B. Gisin, T. Herzog, H. Zbinden, and N. Gisin in Phys. Rev. A 57, 3229 (1998). Thus, non-local quantum correlations can be used to establish links between one location and another, which are immediate, unmediated, and unmitigated.

The military applications for quantum mechanical effects and/or phenomena have already been demonstrated in applications dealing generally with encryption. For example, U.S. Pat. No. 5,339,182 to Kimble et al. discloses an optical information transmission system capable of achieving an information transmission at a signal to noise ratio greater than that which is achievable using classical optical transmission techniques by employing a non-classical, i.e., quantum mechanical, optical transmission technique. In particular, a non-degenerate optical parametric amplifier is employed to generate a pair of signal beams having highly correlated quantum noise. Information is then encoded within each of the signal beams at a signal level far below the level of the quantum noise such that the information encoded on the beams is substantially obscured by the quantum noise. After transmission, the pair of separate signal beams are detected and combined by a receiver. The highly correlated quantum noise is eliminated from the signals, leaving substantially only the encoded information.

Several systems have been proposed for distributing keys. For example, U.S. Pat. No. 5,732,139 to Lo et al. disclose a secure method for distributing a random cryptographic key with reduced data loss. Unlike traditional quantum key distribution systems employing similar probabilities for the different communication modes (thus rejecting at least half of the transmitted data), the disclosed method substantially reduces the amount of discarded data (those that are encoded and decoded in different communication modes e.g. using different operators) in quantum key distribution without compromising security by using significantly different probabilities for the different communication modes. Data is separated into various sets according to the actual operators used in the encoding and decoding process and the error rate for each set is determined individually. Moreover, U.S. Pat. No. 5,764,765 to Pheonix et al. disclose a communication system using quantum cryptography for the distribution of a key, wherein two stations each independently modulate a single-photon signal. The single-photon signal is transmitted to the two stations from an external source, and passes through the stations in series. The signal subsequently passes onto a third station, which detects the state of the signal, and compares it with the state of the signal as originally transmitted. This third station communicates the results of the comparison to the two stations, and the two stations establish a shared secret key for the subsequent encryption of traffic between the stations. Both the source of the single-photon signal and the single-photon detector maybe combined in a transmitter station (Alice). The '765 patent apparently teaches that time synchronization can be accomplishing using an increased-amplitude pulse during transmission of quantum key information.

U.S. Pat. No. 5,768,378 to Townsend et al. also discusses a quantum key distribution process, which is initiated by the synchronization of the system to a master clock in the transmitter. This process provides timing information, which is subsequently used, for decoding the quantum key data. Synchronization is carried out using multi-photon timing pulses, which are broadcast on the optical fibre network; the terminals then detect these pulses and thereby lock their local clocks to the central master clock. The central node then sends a time-referenced sequence of signals of suitable quantum states onto the network, which signal may take the form, for example, of single-photons obtained from a parametric amplifier source or, alternatively, weak pulses of light from an attenuated laser which in general contain no more than one and on average substantially less than one photon per pulse. A later patent to Townsend et al., i.e., U.S. Pat. No. 5,850,441, discloses a method of communication based on quantum cryptography, which method includes an initial step of outputting from, e.g., a transmitter, a single-photon signal, which may be unmodulated. A receiver then randomly selects one of a plurality of encryption alphabets corresponding to different, non-commuting quantum mechanical operators. The receiver modulates the single-photon signal with the selected operator and returns the signal to the transmitter. The transmitter in turn randomly selects a quantum mechanical operator and uses that operator in detecting the returned signal modulated by the receiver.

Due to recent advances in precision instrumentation and a renewed interest in the foundations of quantum theory, much current research has been devoted to the study and demonstration of quantum non-locality effects. In particular, it will be appreciated that, under ideal conditions, the methods employed in the recent experimental demonstration reported in the article by Z. Y. Ou et al. in Phys. Rev. Lett. 68, 3663 (1992) of the Einstein-Podolsky-Rosen (EPR) paradox for continuous variables might be adapted and employed in determining the exact difference between the times of two clocks separated by an arbitrary distance. Even under less than ideal conditions, the associated errors can be made extremely small. Since these errors are largely dependent upon the characteristics of the particular hardware/ software used for implementing such a system, one of ordinary skill in the art can readily determine the parameters that will mitigate such errors and additional discussion of these details will be omitted in the interest of brevity. Thus, the emphasis in the instant application is upon summarizing the underlying quantum physical principles and describing the major features of the associated homodyne detector architecture and method for implementing a clock synchronization system operating under ideal or near ideal conditions.

Before discussing the preferred embodiments according to the present invention, it should be pointed out that although non-local quantum influences occur instantaneously, they cannot be used to send a message faster than the speed of light. In fact, if A and B are observers at distinct locations who are attempting to send such superluminal messages to one another through a non-local quantum link, they will find that their individual receptions will simply be random strings; each will not even be aware that they share such a link. Curiously, however, only if A and B combine and compare their reception profiles post-facto, will they be able to unmask the information bearing hidden regularities induced by the quantum correlations. Thus, although the information can be instantaneously transmitted using such a link, the transmitted information cannot be extracted from the reception profiles until comparisons are performed at a later time. It is this feature that preserves the sanctity of special relativity. As will be seen below, the necessity of this post-facto comparison does not preclude using quantum non-locality as a vehicle for synchronizing clocks. Indeed, it is an integral part of the proposed clock synchronization protocol.

In the quantized electromagnetic field, one measures the field quadrature phase amplitude $\hat{X}_\theta$, which is defined by the equation:

$$\hat{X}_\theta = \hat{a}_e^{-i\theta} + \hat{a}^\dagger e^{i\theta}$$

where $\hat{a}$ and $\hat{a}^\dagger$ are the boson annihilation and creation operators, respectively. When $\theta$ ranges between 0 and $\pi/2$, the quadratures $\hat{X}_1 = \hat{X}_0$ and $\hat{X}_2 = \hat{X}_{\pi/2}$ can be regarded, respectively, as the dimensionless Hermitean position and momentum operators for a field photon. As such, they are canonically conjugate noncommuting observables with $$[\hat{X}_1, \hat{X}_2] = 2i$$

Thus, their values can not be measured simultaneously with arbitrary precision, but rather must conform to the Heisenberg uncertainty relation $$\Delta \hat{X}_1 \Delta \hat{X}_2 \geq 1$$

It will be appreciated that this relation can be satisfied when $\Delta \hat{X}_i < 1$, $i=1$ or 2, but only at the expense of increasing the uncertainty in the associated conjugate quadrature. When this situation occurs, the radiation field is said to be in a squeezed state.

It will also be appreciated that nonlinear optical processes can be used to generate squeezed light. In particular, when an input pump field consisting of two initially independent fields is coupled to a nonlinear medium via the interaction Hamiltonian $$\hat{H} = -\hbar\kappa(\hat{a}^\dagger \hat{b}^\dagger + \hat{a}\hat{b})$$

that produces two outgoing EPR correlated fields, which may be spatially separated if their modes are non-degenerate, i.e., their modes are of different frequencies or possess different polarizations. Here, $\hat{a}$ and $\hat{b}$ are annihilation operators for the two input fields. One of ordinary skill in the art will appreciate that a quantum mechanical operator is associated with each measurable parameter in a physical system, and that the operator associated with the system energy is called the Hamiltonian. Thus, the Hamiltonian contains the operations associated with the kinetic and potential energies. It will be noted that $\hbar = h/2\pi$, where h is Planck's constant and $\kappa$ is the coupling coefficient, which accounts for the nonlinear susceptibility of the medium and the amplitude of the pump field. It should be mentioned that this Hamiltonian describes the interaction associated with a non-degenerate parametric amplifier and has been selected here for the purposes of illustration and discussion. Nonlinear Hamiltonians of this general type have been successful in predicting observed squeezing of light states.

In order to see this, let the quadratures for the other input field be $$\hat{Y}_\phi = \hat{b}_e^{-i\phi} + \hat{b}^\dagger e^{i\phi}$$

where, as before, $\hat{Y}_1 = \hat{Y}_0$ and $\hat{Y}_2 = \hat{Y}_{\pi/2}$. After interacting with the nonlinear medium for a time T, the resulting output quadratures can be expressed by equations (6) through (9), which read as follows:

$$\hat{X}'_1 = \hat{X}_1 \cos h\,\tau + \hat{Y}_2 \sin h\,\tau$$

$\hat{X}'_2 = \hat{X}_2 \cos h\,\tau + \hat{Y}_1 \sin h\,\tau$ $\hat{Y}'_1 = \hat{Y}_1 \cos h\,\tau + \hat{X}_2 \sin h\,\tau$ $\hat{Y}'_2 = \hat{Y}_2 \cos h\,\tau + \hat{X}_1 \sin h\,\tau$ where $\tau = \kappa T$ and $\hat{X}'_i$ and $\hat{Y}'_i$ are the output signal and idler field quadratures, respectively. Since it can be shown that the associated quantum mechanical correlation coefficient $$C = \frac{\langle \hat{X}'_1 \hat{Y}'_2 \rangle}{\sqrt{\langle \hat{X}'^2_1 \rangle \langle \hat{Y}'^2_2 \rangle}}$$

is non-vanishing, then the quadratures $\hat{X}'_1$ and $\hat{Y}'_2$ are EPR correlated. This correlation increases with increased squeezing. In fact, if uncorrelated vacuum states are used as input, then $C = \tan h\,2\tau$ and in the limit $\tau \rightarrow \infty$ (infinite squeezing), C=1, i.e., the quadratures $\hat{X}'_1$ and $\hat{Y}'_2$ in the spatially separated fields are perfectly correlated, as demonstrated in the article by M. D. Reid in Phys. Rev. A 40, 913 (1989).

As a result of this correlation, $\hat{Y}'_2$ can be used to monitor and infer values for $\hat{X}'_1$ at a distance. Specifically, if $\hat{Y}'_2$ is measured in the idler field, then $\hat{X}'_1 = g\hat{Y}'_2$ is the immediate quadrature value obtained by the signal field. It will be appreciated that g is a scaling factor, which is used to compensate for the fact that the correlation is generally imperfect. When g is selected to minimize the variance V given by the expression:

$V = \langle [\hat{X}'_1 + g\hat{Y}'_2]^2 \rangle$ then g takes the form $$g = \frac{\langle \hat{X}'_1 \hat{Y}'_2 \rangle}{\langle [\hat{Y}'_2]^2 \rangle}$$

It should be noted that when the input fields are vacuum states, then $g = \tan h\,2\tau$, so that for infinite squeezing $\hat{X}'_1 = \hat{Y}'_2$.

From the discussion above, it should be appreciated that a balanced homodyne detector can be used to measure fled quadrature components. In each homodyne detector, an input beam is mixed at a 50:50 beam splitter with a classically intense coherent laser beam called the local oscillator. The local oscillator is used to provide a precise phase reference θ for the quadrature measurement. After mixing at the beam splitter, each emerging beam is directed to a photodetector. The photocurrents for each beam are measured and subtracted from one another. This resulting current difference at any instant is proportional to the quadrature $\hat{X}_\theta$ for the input beam.

Homodyne detectors, such as disclosed in U.S. Pat. No. 5,477,369 to Mohon et al., are well known. In the preferred embodiments according to the present invention, the inventors have developed a methodology for using distinct homodyne detectors to measure the spatially separated and correlated signal and idler beam quadratures $\hat{X}'_1$ and $\hat{Y}'_2$ (discussed above) by adjusting the local oscillator phase shifts of each to 0 and $\pi/2$, respectively. If I and J are the homodyne current differences for the signal and idler beams, then $\hat{I} = \lambda \hat{X}'_1$ and $\hat{J} = \mu \hat{Y}'_2$. The variance V above can now be written in terms of the difference between homodyne output currents:

$V = \langle [(\hat{I}/\lambda) - (g/\mu)\hat{J}]^2 \rangle$

From this it can be seen that, when taken individually, each homodyne current provides no hint of an EPR correlation between the signal and idler fields. It is only when these currents are subtracted from one another that the correlation becomes apparent—when the light is squeezed V is minimized and becomes smaller than the V obtained from the non-squeezed light. As will be discussed in greater detail below, it is this sudden post-facto observable reduction in V that makes clock synchronization possible.

Now that the fundamental principle of operation regarding the present invention has been introduced, detailed descriptions regard the preferred embodiments according to the present invention will now be presented. In the discussion which follows, an exemplary embodiment of the inventive apparatus will first be described; a detailed procedure for determining synchronizing widely separated clocks will then be presented.

Figure 1:
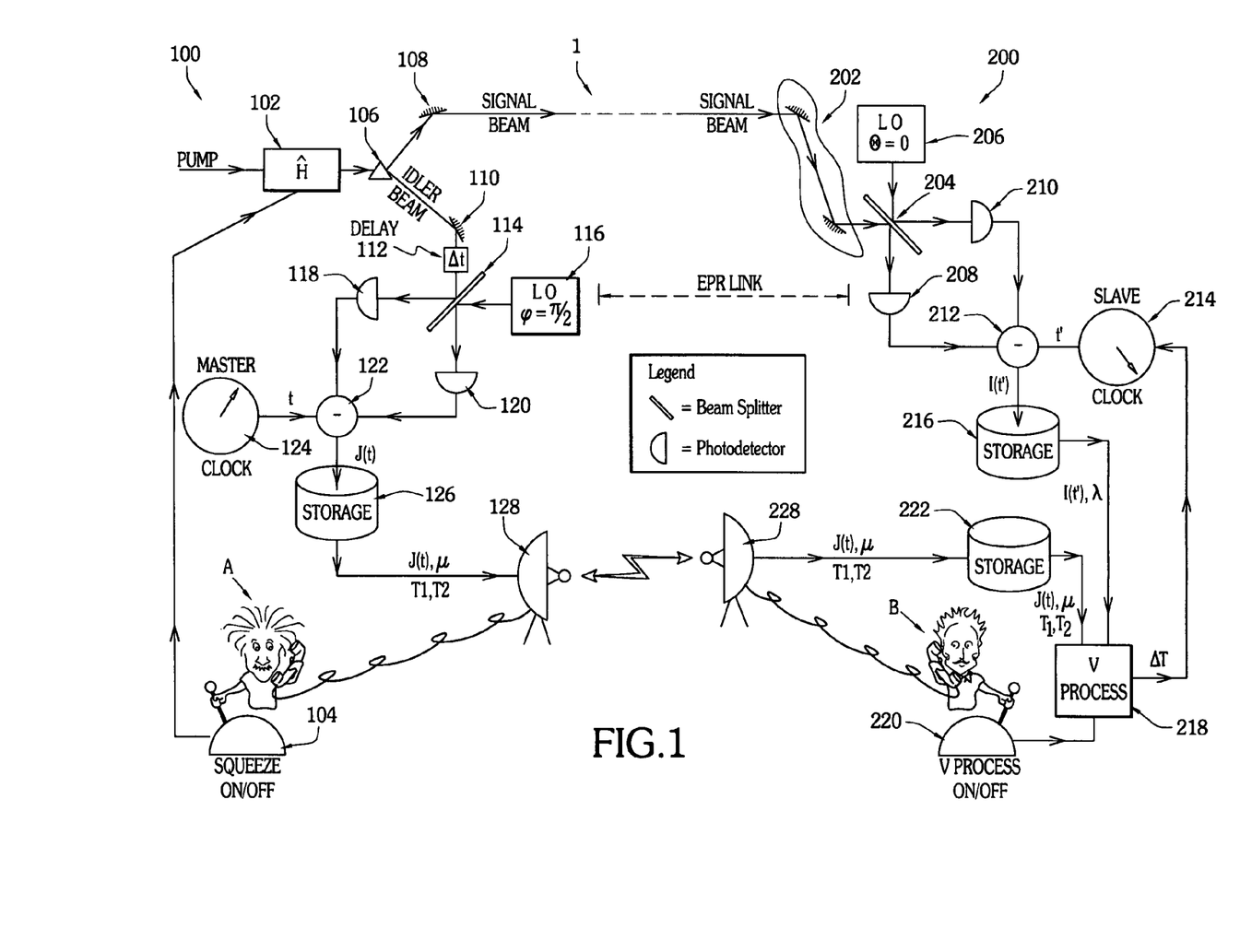
FIG. 1 is a high-level block diagram of an exemplary system for clock synchronization using quantum mechanical non-locality effects according to the present invention.

FIG. 1 is a high level block diagram illustrating an exemplary apparatus of a clock synchronization system 1 representing a first preferred embodiment according to the present invention, which includes a master station 100 and a slave station 200. The master station 100 advantageously includes a master oscillator 102 excited by a pump laser (not shown), which oscillator 102 can switch between first and second operating modes under control of a switch 104, as discussed in greater detail below. The output of master oscillator 102 is divided by a beam splitter 106, eg., a simple prism, to form a signal beam and a idler beam. The signal beam is directed to output optics 108. On the other hand, the idler beam is directed to a beam splitter 114 via an optional reflector 110 and a time delay device 112. It should be mentioned that the value of the delay induced by the device 112 is equal to the travel time of the signal beam to the slave station. Other techniques can be employed to accurately measure the physical separation between the master station 100 and the slave station 200. Measuring and implementing the requisite time delay is considered to be well within the skill of one of ordinary skill in the art and will not be discussed further.

It should also be noted that if the master clock (124) and the slave clock (214) are already synchronized, and the delay (112) is removed from the system, then the method can be employed to determine the delay $\Delta t = \Delta T$ as derived from processor 218. Used in conjunction with the speed of light (c), the associated distance $d = c \cdot \Delta T$ can also be readily obtained. Similarly, the determination of distances $d_1$ and $d_2$ using this method of times $t_1$ and $t_2$, $t_1 > t_2$, respectively, enables the determination of the associated speed $$v = \frac{d_2 - d_1}{t_2 - t_1}$$

along the line of sight from station 100 to station 200.

Still referring to FIG. 1, the beam splitter 114 receives both the time delayed idler signal and the output of a local oscillator 116, each beam impinging on an opposite side to the beam splitter. The beam splitter 114, operating in the conventional manner, generates first and second combined beams which are applied to photodetectors 118 and 120, respectively. The photodetectors 118 and 120 produce a pair of currents that are applied to a subtractor 122 controlled by master clock 124. The resultant signal J(t) is applied to storage device 126, which advantageously can be a first in first out (FIFO) memory, a hard drive, etc. The contents of the storage device 126 are provided over a conventional communication link 128 to the slave station 200 along with the values $\mu$ and T1 and T2, as discussed in greater detail below.

The slave station 200 depicted in FIG. 1 includes a receive optical path 202, which may include one of more beam turning elements, for routing the signal beam to one face of a beam splitter 204, which advantageously receive a local oscillator beam at the opposite face of the beam splitter 204 from local oscillator 206. The output of beam splitter 204 is a pair of combined beams, which are applied to optical detectors 208 and 210. The detectors 208 and 210 produce a pair of currents applied to a subtractor 212, which is controlled by slave clock 214. The resultant data I(t') is provided to a storage device 216, which advantageously can be identical to the storage device 126. It should be mentioned here that although the input to the subtractors 122 and 212 receive analog signals from their respective current detector, the storage devices 126 and 216 store digital data. It will be appreciated that analog to digital converter (ADC) equipment is well know. One of ordinary skill in the art will readily appreciate that ADC devices can be place downstream of either the detectors or the subtractors; the actual location is a matter of design choice.

Still referring to FIG. 1, the slave station 200 preferably includes a processor 218, which can be selectively started and stopped under control of a switch 220. Advantageously, the processor 318 receives data form the storage device 216 and a second storage device 222, which stores data transmitted over the transceiver pair, line 128 and link 228. It will be noted that he data provided to the processor 218 from the storage device included both $\lambda$ and I(t'), as discussed in greater detail below. The output of processor 218, $\Delta T$, i.e., the error between the master and salve clocks, is applied to the slave clock 218. It will also be noted that the transceiver pair 128, 228 advantageously form a secure communications channel.

The operation of the clock synchronization system 1 illustrated in FIG. 1 will be described in detail below. Before describing the operation, it would be helpful to define the variables and assumptions employed in operating the clock synchronization system. Thus, let A and B be observers at distinct locations separated by an arbitrary distance. Assume that B wishes to synchronize his/her clock with that of A. Furthermore, the clock synchronization system 1 is constrained such that:

(1) A has the necessary laser instrumentation to produce and direct bright squeezed light and that this instrumentation allows A to control and instantaneously switch between squeezed and non-squeezed bright light states, i.e., between the first and second modes of operation of the master oscillator 102;

(2) there is an artificial time delay in the idler beam which exactly compensates for the signal beam transmission delay;

(3) both A and B have homodyne measurement systems, i.e., homodyne detectors, and the parameters $\lambda$ and $\mu$ of these systems are known;

(4) A's local oscillator (116) has a phase shift setting of $\pi/2$ in order to measure the quadrature $\hat{Y}_{2'}$ of the idler field;

(5) B's local oscillator (206) has a phase shift setting of 0 in order to measure quadrature $\hat{X}_{1'}$ of the signal field;

(6) A and B can continuously record and store their homodyne output currents as functions of their respective clock times (J(t) and I(t'), respectively);

(7) A and B are connected by a classical two way communication link (128, 228);

(8) the signal beam from A can be acquired by B;

(9) clock and phase drift for both the master and slave clocks are insignificant;

(10) B has the computational resources (V process; i.e., processor 218) needed to perform the necessary post-facto current profile comparisons; and (11) all processing delays are insignificant.

The novel method according to an exemplary embodiment of the present invention produces the clock correction $\Delta T$ that will bring B's clock into agreement with A's clock. It will be noted that all of the communication steps employed in the novel method, other than the instantaneous quadrature measurement using the EPR link, are performed using the classical two-way link. The general terms, the overall method includes that following steps:

(1) B contacts A using the classical communication link and requests to have his/her clock synchronized with A's clock;

(2) A acknowledges the request, transmits a nonsqueezed signal beam to B, and requests that B notify him/her when the beam has been acquired and lock achieved;

(3) B acquires and locks onto the nonsqueezed signal beam and informs A of this status;

(4) A acknowledges B's communication and informs him/her that he/she should now start his/her homodyne and recording systems;

(5) A and B start their homodyne and recording systems;

(6) A and B confirm to one another that their homodyne systems have been started and are successfully recording and storing current profiles;

(7) A squeezes the signal beam starting at his/her clock time T1 and ending at his/her clock time T2, (8) A accurately records from his/her clock the time T 1 that he initiated squeezing and the time T2 that he ceased squeezing;

(9) A turns off his/her homodyne and recording systems, (10) A informs B that he will discontinue beam transmission;

(11) A turns off the signal beam;

(12) B turns off his/her homodyne and recording systems, (13) Using the standard communication link, A transmits from his/her storage unit to B's storage unit the current profile J(t), $\mu$, T1, and T2;

(14) After this transmitted data is stored, B initiates the V process; and (finally)

(15) $\Delta T$ is calculated by the V process and applied to B's clock,

The two clocks have now been synchronized using the "instantaneous" EPR link.

Figure 2:
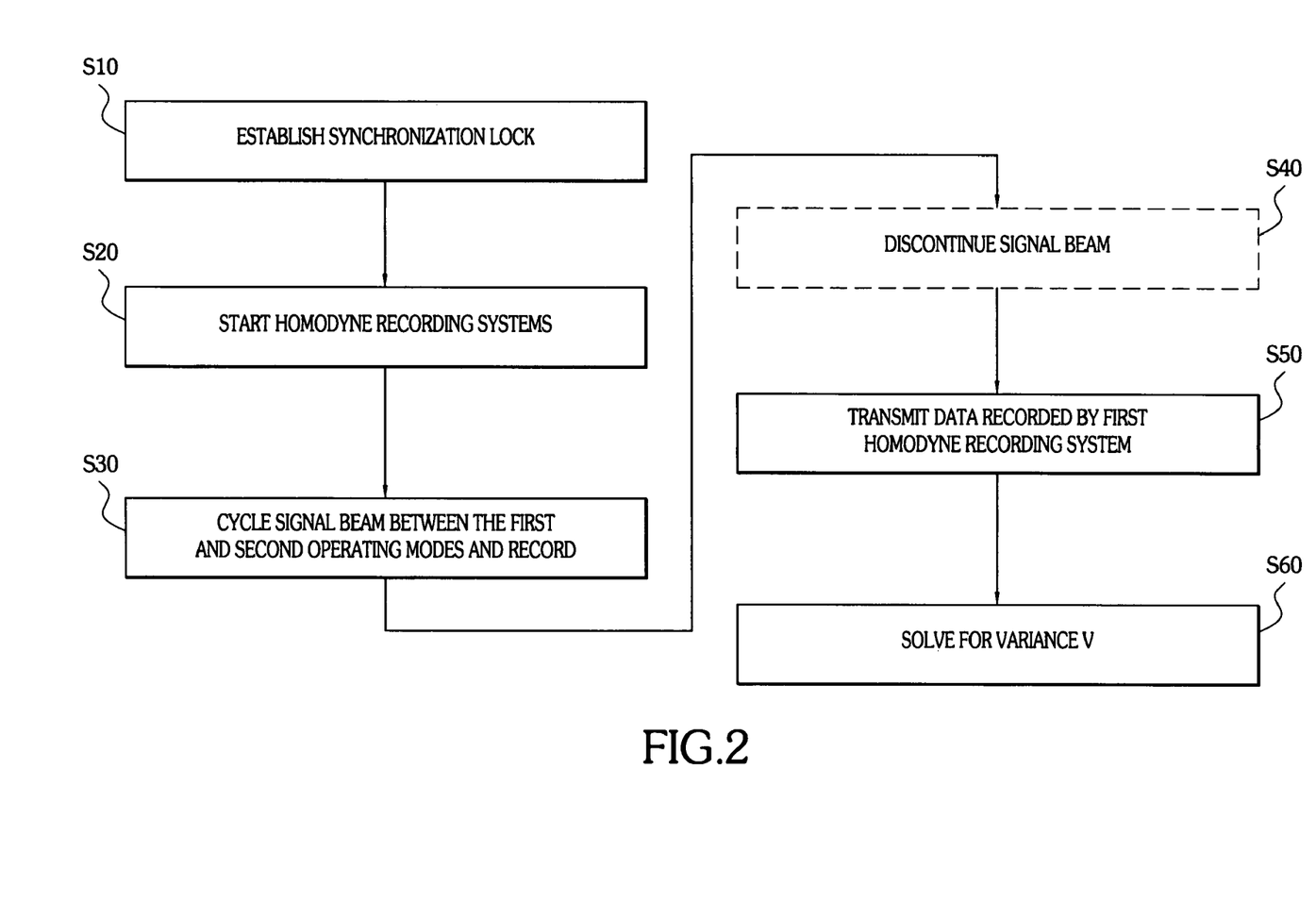
FIG. 2 illustrates is a flowchart depicting an exemplary method of operating the clock synchronization system illustrated in FIG. 1.

More specifically, the method according to the present invention begins a step S10, during which the mater system 100 and the slave system 200 achieve synchronization lock on a signal beam produced by the master oscillator 102 operating in a first operating mode, i.e., a nonsqueezed operating mode. It will be appreciated that the exchanges between the two systems needed to coordinate and confirm that synchronization lock has been established can be manually initiated or initiated at predetermined times. During step S20, the homodyne recording systems in the master and slave stations 100, 200 are started. It will be appreciated that the homodyne detector in master station 100 advantageously includes beam splitter 114, local oscillator 116, photodetectors 118, 120, and subtractor 122. In contrast, the homodyne detector in slave system 200 beneficially includes beam splitter 204, local oscillator 206, optical detectors 208 and 210 and subtractor 212. During step S30, the signal beam is cycled between the first and second, i.e., nonsqueezed and squeezed, operating modes and the times T1 and T2 indicating the start and stop, respectively, of the second mode of operation are recorded. Subsequently, the signal beam is discontinued during step S40. It will be appreciated that S40 is optional; it is designed to minimize the amount of data being transmitted over the conventional communications link 128, 228.

As mentioned immediately above, the data recorded in storage device 126, i.e., the data representing J(t), $\mu$, T1 and T2 are transmitted over the conventional communication link 128, 228 and stored in storage device 222 during step S50. This data, as well as the data recorded in device 216, i.e., I(t'), and the characteristic $\lambda$, are applied to the processor 218, which solves for the variance V between the master and slave clocks, i.e., $\Delta T$, during step S60.

It will be appreciated that clock synchronization has been performed, in principle, in a manner that is free of the error associated with traditional approaches which rely upon classical signal propagation. If there were no other error sources, then the two clocks would be in perfect synchronization. Unfortunately, there are other errors that prevent this, including:

(a) signal generation/transmission/reception/processing delays; and (b) algorithmic/computational errors generated by the V process.

It will be noted that type (a) errors are equipment related and have been mentioned above; such errors are typically small and can generally be accurately modeled and applied as clock offsets. It will also be noted that type (b) errors depend upon the characteristics of the V process algorithm and can't be adequately quantified for any particular algorithm until that algorithm has been constructed and tested. However, it is believed that—provided there is adequate time resolution for the stored J(t) and I(t') current profiles—the V process error can be made extremely small.

It should be mentioned at this point that there is also a non-typical error related to the quality of the EPR correlation. This originates primarily from the non-mono-chromatic nature of the pump laser and the interaction Hamiltonian that produces the squeezed light, as well as homodyne detection losses. Since these errors advantageously can be largely compensated for by the V process algorithm, they can be considered as type (b) errors.

Since the purpose of the V process is to determine the $\Delta T$ correction from the stored homodyne measurement data, it is a fundamentally important part of the system architecture. Thus, it will be appreciated that the primary functions of the V process implemented by processor 218 are set forth immediately below.

Figure 3:
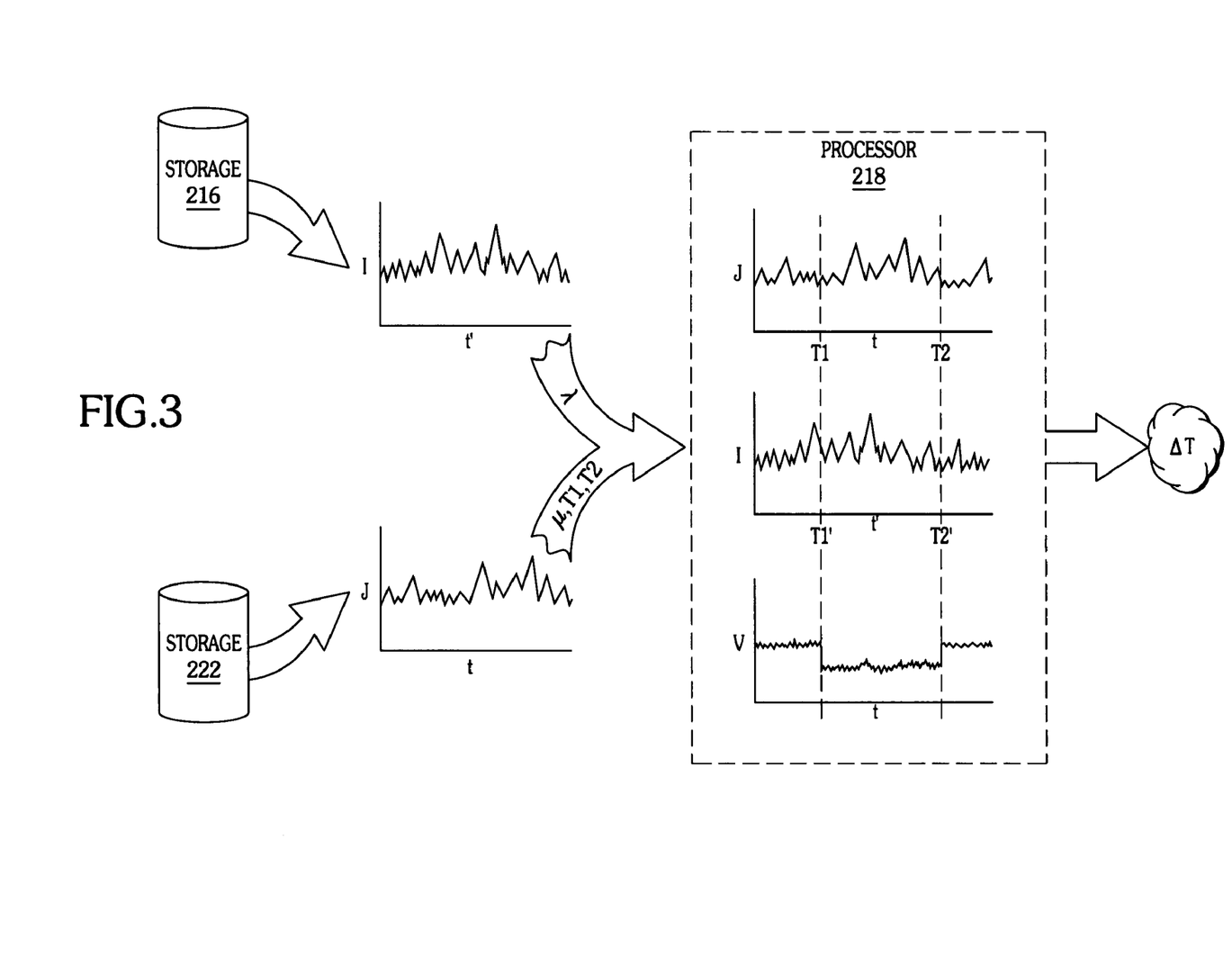
FIG. 3 graphically illustrates the operation of selected ones of the components in the clock synchronization system pictured in FIG. 1.

As shown in FIG. 1 and outlined in the above protocol, the V process is the automated post-facto comparison of A's and B's measurement data. Using the known master clock times T1 and T2, which mark the interval during which the EPR link was established in the signal beam, the V process shifts the slave clock's time axis t' along the master clock's time axis t until the variance V (as defined above) of the current difference profile is a minimum within the master clock's T1–T2 time interval. It will be appreciated that this amount to sliding the I(t') data with respect to the J(t) data recorded between times T1 and T2. One of ordinary skill in the art of signal processing will appreciate that this is analogous to many motion estimation procedures, although the present processing is simplified since only two sequential data streams are being resolved. Thus, this provides for a straightforward identification of the associated slave clock time interval T1'→T2', thereby yielding the desired correction $\Delta T = T1 - T1' = T2 - T2'$, so that $t = t' + \Delta T$. This process is depicted in FIG. 3. It will be appreciated that the average of the sum of the two differences advantageously could be employed instead of the expression given immediately above.

As alluded to above, it is not possible to precisely quantify the errors associated with the $\Delta T$ extraction until the specific V process algorithm being implemented is constructed and tested. Clearly, this extraction procedure will involve such numerical methods as Fourier integration, interpolation, smoothing, and averaging. Thus, the precision of the extracted $\Delta T$ will depend upon the quality of the numerical techniques used to perform these functions. Given that (1) such high quality numeric exist and are well understood;

(2) computing machines with adequate numerical precision are readily available;

(3) the time resolution for the current profiles I(t') and J(t) can be made "refined enough"; and (4) the squeeze "on" and "off" times can be made "instantaneous enough," then type (b) errors advantageously can be neglected.

It should be mentioned that there is little that is special about the elements that form the clock synchronization system 1. As previously mentioned, homodyne detectors and corresponding methods have been used successfully for over a decade; thus, their properties are well understood. Reliable techniques for the generation of squeezed light states have also been developed in recent years. In fact, compact, reliable, and bright sources of squeezed light seem to be reaching useable levels of maturity. In addition, industrial packaging and hardening technologies are available which could be applied to these architectural elements to "ruggedize" them and make field-useable versions of the system practical.

Before closing, it should be mentioned that the approach discussed above does not exploit quantum non-locality effects to the fullest extent. Although full use is made of the immediate property via the EPR link produced by squeezing the light, the fact that signal and idler beams must be used to deliver and maintain a continuous supply of EPR correlated photons to A and B clearly affects the guarantee of an unmediated and unmitigated non-local quantum link. However, as long as this supply is not degraded, the EPR link between A and B possesses these three desired properties.

This "continuous supply" technique is the current state of the art approach to producing correlated quantum systems and has been suggested as the vehicle for exploiting quantum non-locality effects for such applications as teleportation, quantum cryptography (discussed above), and interaction-free measurement. If stable correlated states of quantum objects could be produced and stored for long periods of time, then the "continuous supply" technique would no longer be required. It would then be possible to more effectively exploit all three of these properties that make quantum non-locality so attractive. Indeed, this production and storage of correlated quantum systems is the Holy Grail for applied quantum non-locality research.

It should be mentioned that the detailed discussion of an exemplary apparatus and corresponding method according to the present invention focused on the synchronization of two spatially repeated clocks, i.e., the synchronization of a single "slave" clock to a master clock, the present invention is not so limited. Various methods for either a parallel or sequential synchronization of multiple "slave" clocks to a master clock will undoubtedly occur to one of ordinary skill in the art after reading the above description of the preferred embodiments according to the present invention; all such variations are considered to be within the scope of the present invention.

Although presently preferred embodiments of the present invention have been described in detail herein, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A method for synchronizing a master clock to a slave clock located in master and slave devices communicating with one another via a laser signal beam and a communications channel, each of the master and slave devices including a homodyne detector for determining a respective correlation pattern with respect to a phase tuned local oscillator, comprising:
    recording master and slave correlation patterns while the signal beam cycles between first and second operating modes;
    transmitting the master correlation pattern and associated first time at which the laser signal beam shifted between the first and second operating modes and second time at which the laser signal beam shifted between the second and first operating modes over the communications channel;
    comparing a portion of the master correlation pattern between the first and second times to the slave correlation pattern to thereby determine the time offset between the master and slave correlation patterns;
    and applying the time offset to the slave clock.

2. The method as recited in claim 1, further comprising generating the master correlation pattern in response to a master local oscillator beam and a time-delayed version of the signal beam.

3. The method as recited in claim 2, wherein the time delay associated with the time-delayed version of the laser signal beam corresponds to the laser signal beam transit time between the-master and slave devices.

4. The method as recited in claim 1, wherein the first and second operating modes of the laser signal beam have different polarization states.

5. A method for synchronizing a master clock to a slave clock located in master and slave devices communicating with one another via a laser signal beam and a communication channel, each of the devices including a homodyne detector for determining a respective correlation pattern with respect to a phase tuned local oscillator, comprising:
    recording master and slave correlation patterns while the laser signal beam cycles between first and second operating modes;
    transmitting the master correlation pattern and associated first time at which the laser signal beam shifted between the first and second operating modes and second time at which the laser signal beam shifted between the second and first operating modes over the communications channel;
    calculating a time variance between a portion of the master correlation pattern between the first and second times to the slave correlation pattern to thereby determine the time offset between the master and slave correlation patterns; and
    applying the time offset to the slave clock.

6. The method as recited in claim 5, further comprising generating the master correlation pattern in response to a master local oscillator beam and a time-delayed version of the laser signal beam.

7. The method as recited in claim 6, wherein the time delay associated with the time-delayed version of the laser signal beam corresponds to a the laser signal beam transit time between the master and slave devices.

8. The method as recited in claim 5, wherein the variance between the master and slave correlation patterns is determined in accordance with the expression:

$$V = \langle [(\hat{I}/\lambda) - (g/\mu)\hat{J}]^2 \rangle$$

where:
V is the variance
$\mu$ is the phase offset associated with a master homodyne detector generating the master correlation pattern corresponding to $\hat{J}$,
$\hat{J}$ is the idler homodyne current signal received by the master device,
$\lambda$ is the phase offset associated with a slave homodyne detector generating the slave correlation pattern corresponding to $\hat{I}$,
$\hat{I}$ is the signal homodyne current signal received by the slave device; and
g is a scaling factor.

9. A clock synchronization system permitting synchronization of a slave clock to a master clock located in slave and master devices, respectively, communicating with one another via two separate communication channels, comprising:
    means for generating a laser beam signal disposed in the master device, wherein the signal beam has first and second operating modes;
    means for applying the signal beam to the slave device over a master communications channel;
    a master homodyne detector disposed in the master device receiving a master phase shifted local oscillator beam;
    a slave homodyne detector disposed in the slave device receiving a second phase shifted local oscillator beam;
    means for recording master and slave correlation patterns generated by the master and slave homodyne detectors while the signal beam cycles between first and second operating modes;
    means for transmitting the master correlation pattern and associated first and second times at which the signal beam shifted between the first and second operating modes and between the second and first operating modes over the second communications channel;
    means for calculating a time variance between a portion of the master correlation pattern between the first and second times to the slave correlation pattern to thereby determine the time offset between the master and slave correlation patterns; and
    means for applying the time offset to the slave clock.

10. The clock synchronization system as recited in claim 9, wherein the master homodyne detector generates the master correlation pattern in response to the master phase shifted local oscillator beam and a time-delayed version of the signal beam.

11. The clock synchronization system as recited in claim 10, wherein the time delay associated with the time-delayed version of the signal beam corresponds to a signal beam transit time between the-master and slave devices.

12. The clock synchronization system as recited in claim 9, wherein the first and second operating modes have different polarization states.

13. The clock synchronization system as recited in claim 9, wherein the variance between the master and slave correlation patterns is determined in accordance with the expression:

$$V=<[(\hat{I}/\lambda)-(g/\mu)\hat{J}]^2>$$

where:

V is the variance $\mu$ is the phase offset associated with a master homodyne detector generating the master correlation pattern corresponding to $\hat{J}$, $\hat{J}$ is the idler homodyne current signal received by the master device, $\lambda$ is the phase offset associated with a slave homodyne detector generating the slave correlation pattern corresponding to $\hat{I}$, $\hat{I}$ is the signal homodyne current signal received by the slave device; and g is a scaling factor.

14. A clock synchronization system to synchronize clocks comprising:

a first communications channel;

a second communications channel;

a master device comprising:

a laser to generated a signal beam having first and second operating modes;

an output to transmit the signal beam on the first communications channel;

a master homodyne detector to generate a master correlation pattern based on the signal beam while the signal beam cycles between first and second operating modes;

a storage device to store the master correlation pattern beginning at a first time at which the signal beam shifted between the first and second operating modes and ending at a second time at which the signal beam shifted between the second and first operating;

a transmitter to transmit the stored master correlation pattern and associated first and second times on the second communication channel; and a slave device comprising;

a receiver to receive the signal beam from the first communications channel;

a slave homodyne detector to generate a slave correlation pattern based on the received signal beam while the received signal beam cycles between first and second operating modes;

a storage device to store the slave correlation pattern;

a receiver to receive the transmitted master correlation pattern and associated first and second times from the second communication channel; and a processor to determine a time variance between a portion of the received master correlation pattern between the first and second times to the stored slave correlation pattern, to determine the time offset between the master and slave correlation patterns based on the determined time variance, and to apply the time offset to the slave clock.

15. The clock synchronization system of in claim 14, wherein the master homodyne detector generates the master correlation pattern in response to a master phase shifted local oscillator beam and a time-delayed version of the signal beam.

16. The clock synchronization system of in claim 15, wherein the time delay associated with the time-delayed version of the signal beam corresponds to the signal beam transit time between the-master and slave devices.

17. The clack synchronization system of in claim 14, wherein the first and second operating modes have different polarization states.

18. The clock synchronization system of in claim 14, wherein processor determines the variance between the master and slave correlation patterns in accordance with the expression:

$$V=<[(\hat{I}/\lambda)-(g/\mu)\hat{J}]^2>$$

where:

V is the variance $\mu$ is the phase offset associated with a master homodyne detector generating the master correlation pattern corresponding to $\hat{J}$, $\hat{J}$ is the idler homodyne current signal received by the master device, $\lambda$ is the phase offset associated with a slave homodyne detector generating the slave correlation pattern corresponding to $\hat{I}$, $\hat{I}$ is the signal homodyne current signal received by the slave device; and g is a scaling factor.

19. The clock synchronization system of claim 14 wherein the laser beam signal is squeezed in the second operating mode.

20. The method of claim 1 wherein the laser beam signal is squeezed in the second operating mode.

21. The method of claim 5 wherein the laser beam signal is squeezed in the second operating mode.

22. The system of claim 9 wherein the laser beam signal is squeezed in the second operating mode.

* * * * *